United States Patent
Kim et al.

(10) Patent No.: US 9,238,403 B2
(45) Date of Patent: Jan. 19, 2016

(54) RADIATOR BUSHING

(71) Applicant: Hyundai Motor Company, Seoul (KR)

(72) Inventors: Seung-Won Kim, Seoul (KR);
Sung-Soo Chae, Suwon-si (KR);
Yong-Jin Kim, Gwangmyeong-si (KR);
Hyo-Chan Bae, Hwasung-si (KR);
Man-Hee Park, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 67 days.

(21) Appl. No.: 14/071,292

(22) Filed: Nov. 4, 2013

(65) Prior Publication Data

US 2014/0319310 A1     Oct. 30, 2014

(30) Foreign Application Priority Data

Apr. 26, 2013  (KR) .................. 10-2013-0046889

(51) Int. Cl.
*F16M 13/00*  (2006.01)
*B60K 11/04*  (2006.01)
*F16F 1/36*   (2006.01)

(52) U.S. Cl.
CPC . *B60K 11/04* (2013.01); *F16F 1/36* (2013.01); *F01P 2070/52* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,519,467 A | * | 5/1985 | Saunders | 180/68.4 |
| 4,858,866 A | * | 8/1989 | Werner | 248/213.3 |
| 4,871,152 A | * | 10/1989 | Funahashi | 267/140.12 |
| 5,024,425 A | * | 6/1991 | Schwerdt | 267/140.12 |
| 5,040,764 A | * | 8/1991 | Dubois | 248/635 |
| 5,078,224 A | * | 1/1992 | Attinger et al. | 180/68.4 |
| 5,374,038 A | * | 12/1994 | Hein | 267/140.5 |
| 5,475,275 A | * | 12/1995 | Dohogne et al. | 310/89 |
| 5,521,447 A | * | 5/1996 | Bertolini et al. | 310/51 |
| 5,760,512 A | * | 6/1998 | Ohi et al. | 310/91 |
| 5,911,936 A | * | 6/1999 | Hanazaki et al. | 264/250 |
| 6,668,956 B1 | * | 12/2003 | Pelage et al. | 180/68.4 |
| 7,118,018 B2 | * | 10/2006 | Turk | 227/10 |
| 8,777,537 B2 | * | 7/2014 | Fritsch | 411/338 |
| 2013/0285298 A1 | * | 10/2013 | Nakamura et al. | 267/141 |

FOREIGN PATENT DOCUMENTS

| | | |
|---|---|---|
| JP | 63-069621 | 3/1988 |
| JP | 02-115745 | 4/1990 |
| JP | 2006-008129 A | 1/2006 |

* cited by examiner

*Primary Examiner* — Monica Millner
(74) *Attorney, Agent, or Firm* — McDermott Will & Emery LLP

(57) ABSTRACT

A radiator bushing mounted in a vehicle body to support a load of a radiator includes a mounting portion having an outer side fixed to the vehicle body, a center core at a center with a center hole, and a support portion having an inner side and an outer side. The support portion includes a first support portion and a second support portion with an inclined angle α of the first support portion and an inclined angle β of the second support portion are determined to be different.

The support portion has a two-stage structure in which inclined angles are different, and a direction ratio of a Z axis direction to an X axis direction and a Y axis direction may be easily adjusted.

3 Claims, 5 Drawing Sheets

SMALL OR MEDIUM
SIZED VEHICLE

LARGE OR MEDIUM
SIZED VEHICLE

RADIATOR BUSHING

CROSS-REFERENCE TO RELATED APPLICATIONS

This application claims under 35 U.S.C. §119 priority to and the benefit of Korean Patent Application No. 10-2013-0046889, filed on Apr. 26, 2013, in the Korean Intellectual Property Office, the disclosure of which is incorporated herein by reference in its entirety.

TECHNICAL FIELD

The present disclosure relates to a radiator bushing which is mounted on a frame of a vehicle body to support a load of a radiator, and more particularly, to a radiator bushing developed to more efficiently attenuate vibration, which occurs in an engine, by improving dynamic characteristics in a Z direction.

BACKGROUND

A radiator of a vehicle serves as a heat radiating plate for cooling an engine. The radiator of a general passenger vehicle is disposed at a front side of the vehicle in order to decrease a temperature of the coolant which circulates in the engine and the radiator. The heat of a coolant is radiated by utilizing the wind generated when the vehicle travels and air blowing from a cooling fan.

The radiator also serves as a dynamic damper that attenuates vibration of the vehicle body when the vehicle idles. That is, the radiator releases vibration energy by synchronizing a main frequency (explosion excitation frequency) of the engine when the vehicle idles.

As regards values of dynamic characteristics of a radiator bushing in an X direction (left and right direction of the vehicle body) or in a Y direction (forward and rearward direction of the vehicle body), vibration isolation performance tends to improve as a value of dynamic characteristics becomes smaller. In order for the radiator to serve as a dynamic damper, a value of the dynamic characteristics of a bushing, which connects the vehicle body and the radiator, in a Z direction (up and down direction of the vehicle body) needs to be particularly determined as a more important factor in terms of isolation and attenuation of vibration compared to values of dynamic characteristics in the X direction and the Y direction.

Therefore, in order to improve noise, vibration, and harshness (NVH) performance of the vehicle, the radiator bushing needs to be designed considering the aforementioned factor.

However, because of restrictive conditions such as size, disposition structure, and interval of the radiator and a FEM (front end module), space and size for mounting the radiator bushing are restrictive at the time of designing the radiator bushing.

FIG. 1 illustrates a structure of a radiator bushing in the related art. Referring to FIG. 1, a radiator bushing $1a$, which is mounted in a small or medium sized passenger vehicle, has a structure in which the radiator bushing $1a$ is mounted on a frame 4 of the vehicle body, and a radiator pin 3 is mounted thereon. A metallic stopper $2a$ is disposed in a portion where the radiator bushing $1a$ is mounted on the frame 4 of the vehicle body. Similarly, a radiator bushing $1b$, which is mounted in a large or medium sized vehicle, also has a structure in which the radiator bushing $1b$ is mounted on the frame 4 of the vehicle body, and the radiator pin 3 is mounted thereon. The structure describes a metallic stopper $2b$ having a size greater than that of the metallic stopper $2a$, and a concavely recessed portion is formed on the radiator bushing $1b$ so that the radiator pin 3 may be further elastically moved in the X and Y directions.

When comparing the two types of radiator bushings with each other, because the radiator bushing $1a$ mounted in the small or medium sized vehicle is less elastically deformed in the Z direction as well as the X and Y directions, an effect of attenuating vibration is relatively low. In contrast, because the radiator bushing $1b$ mounted in the large or medium sized vehicle is relatively more deformed in the X and Y direction at a "T" portion, the effect of attenuating vibration needs to be further improved.

Meanwhile, space for mounting the radiator is insufficient at a front side of the vehicle where the radiator is mounted, which has been a restrictive condition at the time of designing the radiator bushing. In addition, dynamic characteristics values in the X and Y directions are always higher than that in the Z direction. Therefore, unnecessary vibration is transferred to the X and the Y directions when the engine idles, thereby deteriorating the NVH (noise, vibration, and harshness) performance.

SUMMARY

The present disclosure has been made in an effort to provide a radiator bushing capable of more efficiently determining dynamic characteristics in an X direction and Y direction corresponding to vehicle characteristics, satisfying durable performance of a single item and securing the degree of freedom of tuning thereof by improving dynamic characteristics in a Z direction without increasing the size of the radiator bushing.

An aspect of the present disclosure is a radiator bushing, which is mounted in a vehicle body to support a load of a radiator and configured so that a pin of the radiator is inserted into a center hole penetrating in a vertical direction. The radiator bushing includes: a mounting portion having an outer side fixed to the vehicle body and formed in a ring shape. A center core stands vertically at a center of the mounting portion and has a center hole. A support portion has an inner side connected to the center core, and an outer side connected to an inner circumferential surface of the mounting portion. The support portion includes a first support portion extending downward from an upper end of the center core, and a second support portion extending downward from the first support portion and connected to the inner circumferential surface of the mounting portion. An inclined angle α of the first support portion and an inclined angle β of the second support portion are different.

In the exemplary embodiment of the present disclosure, the inclined angle of the first support portion may be greater than the inclined angle of the second support portion such that the first support portion stands more vertical than the second support portion.

The upper end of the center core may be formed to protrude upward from the mounting portion, the radiator bushing may comprise a synthetic resin material having elasticity, and a ring shaped stopper comprising a material having rigidity higher than that of a material of the radiator bushing may be mounted inside the mounting portion.

One or more drain holes may be perforated in the support portion.

The support portion according to an example of the present disclosure is configured in the two-stage structure having different inclined angles such that a direction ratio (a Z-axis direction to an X-axis direction and a Y-axis direction) may be easily adjusted.

Because the stopper is provided, durability of the radiator bushing may be improved, and an amount of behavior may be controlled.

Abrasion or deformation of a material due to freezing or the like may be suppressed because of the drain hole, and characteristics of the radiator bushing may be tuned in accordance with a size and a disposition.

DETAILED DESCRIPTION OF THE EMBODIMENTS

Figure 1:
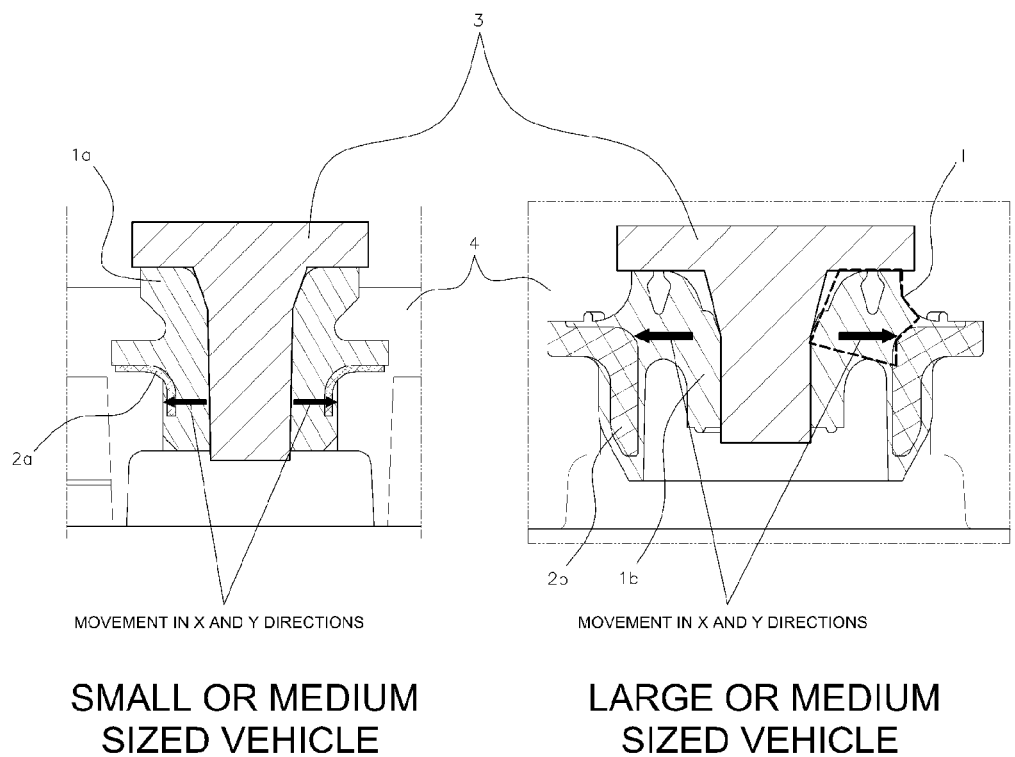
FIG. 1 are views illustrating an aspect of a cross-section in which radiator bushings of the related art are mounted.

A radiator bushing 100 of the present disclosure, manufactured with a material having elasticity, such as a synthetic resin or a synthetic rubber material, is mounted in the vehicle body to support a load of a radiator. A radiator pin 50 mounted on the radiator is inserted into a center hole 31 penetrating in a vertical direction. Further, the radiator bushing 100 includes a mounting portion 10, a center core 30, and a support portion 20.

Hereinafter, the radiator bushing according to an exemplary embodiment of the present disclosure will be described in more detail with reference to the drawings.

Figure 2:
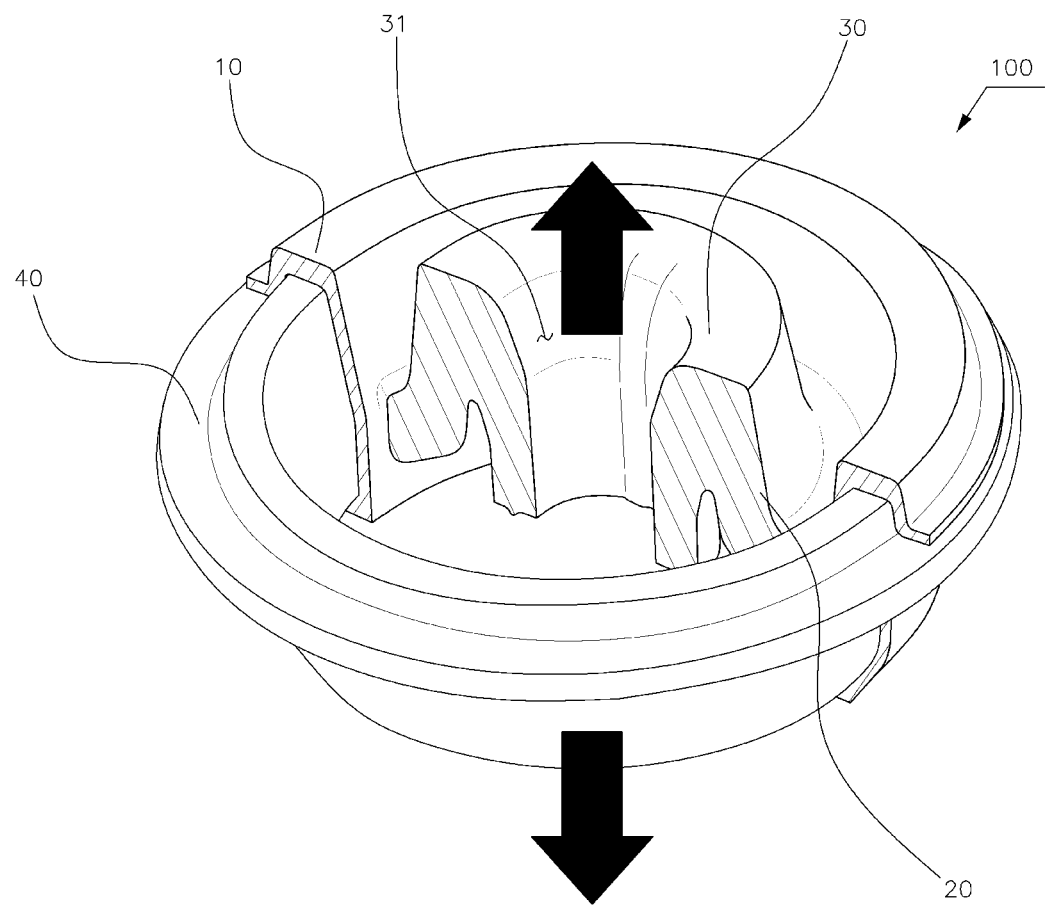
FIG. 2 is a view illustrating a partially cut state for showing an inside aspect of a radiator bushing according to an exemplary embodiment of the present disclosure.
Figure 3:
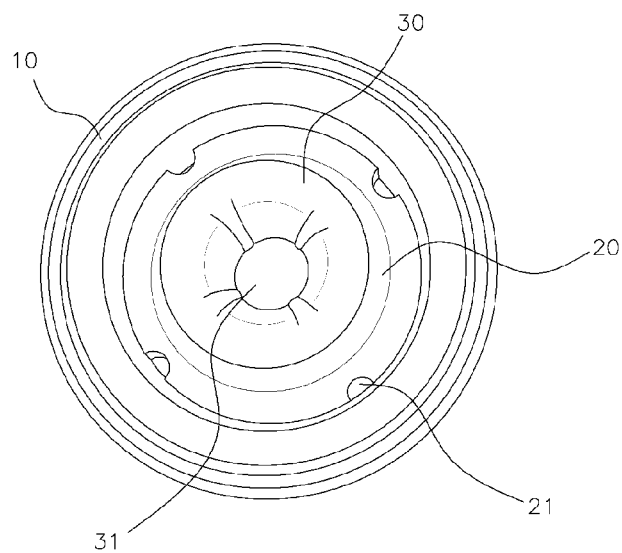
FIG. 3 is a plan view of the radiator bushing according to the exemplary embodiment of the present disclosure.
Figure 4:
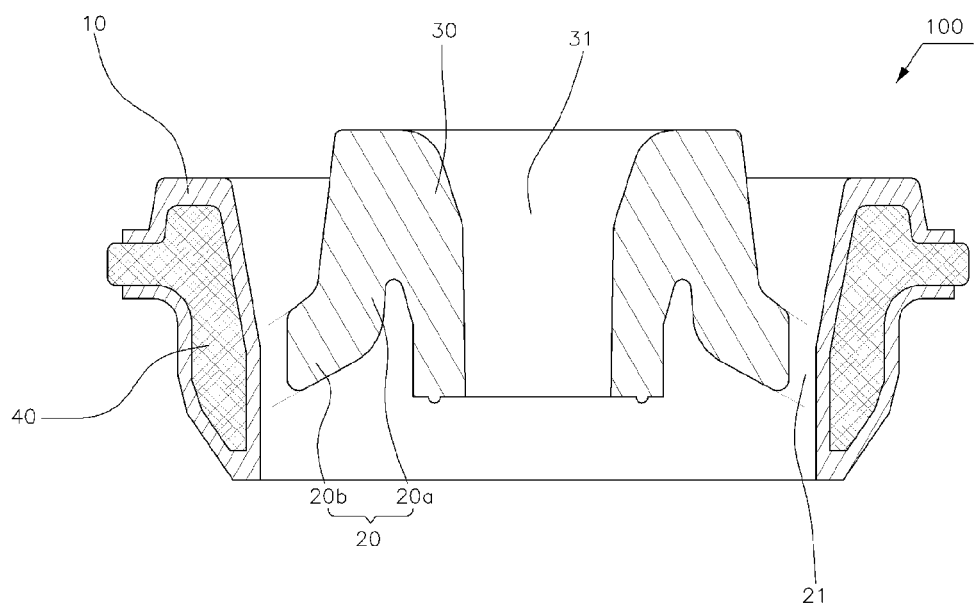
FIG. 4 is a cross-sectional view of the radiator bushing according to the exemplary embodiment of the present disclosure.

Referring to FIGS. 2 to 4, the mounting portion 10 includes a ring shaped stopper 40 manufactured with metallic or synthetic resin material having rigidity higher than that of the radiator bushing 100, and formed in a ring shape so that an outer side of the mounting portion 10 may be fixed to the vehicle body. An inner circumferential surface of the mounting portion extends to form the support portion 20 inward, and the center core 30, which stands vertically at a center of the mounting portion 20 and has the center hole 31, is formed inside the support portion 20.

Therefore, the support portion 20 has an inner side connected to the center core 30, and an outer side connected to the inner circumferential surface of the mounting portion 10.

The support portion 20 includes a first support portion 20a extending downward from an upper end of the center core 30, which protrudes upward from the mounting portion 10, and a second support portion 20b extending downward from the first support portion 20a and connected to the inner circumferential surface of the mounting portion 10. An inclined angle α of the first support portion 20a and an inclined angle β of the second support portion 20b are different.

Figure 5:
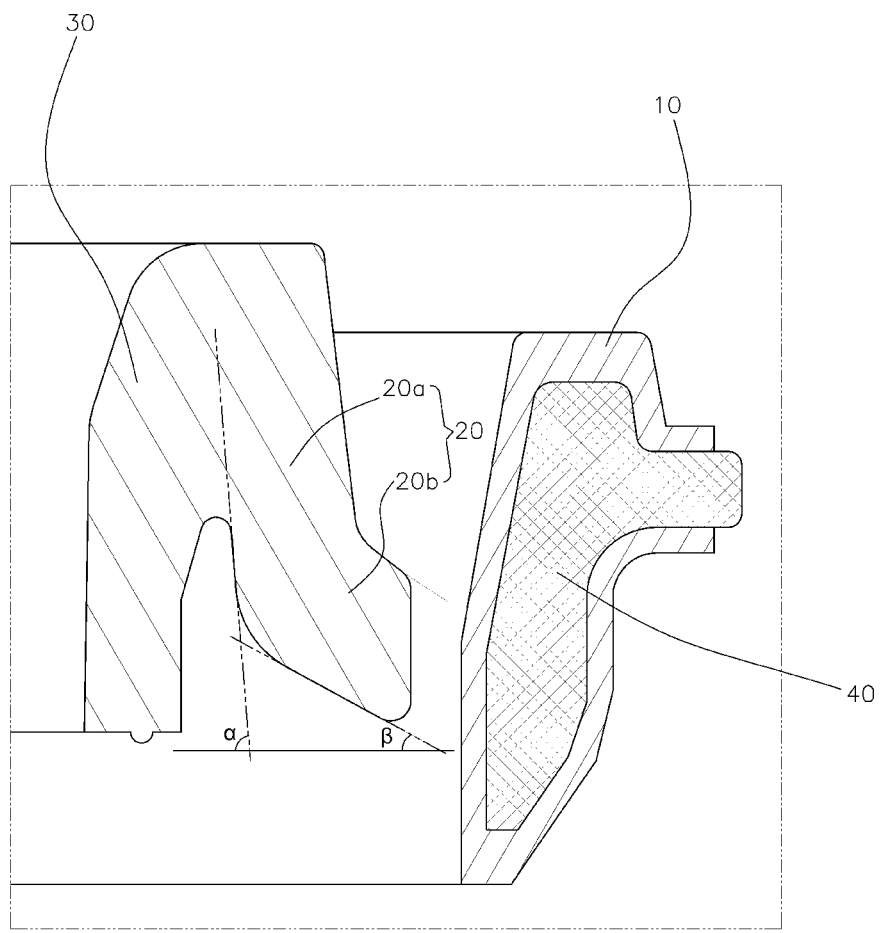
FIG. 5 is a partially enlarged view of FIG. 4.

Referring to FIG. 5, the inclined angle α of the first support portion 20a is greater than the inclined angle β of the second support portion 20b such that the first support portion 20a stands more vertical than the second support portion 20b.

In addition, the radiator bushing 100 has one or more drain holes 21 perforated in the support portion 20 and spaced apart from each other so that rain water and/or alien substances may be drained downward.

Figure 6:
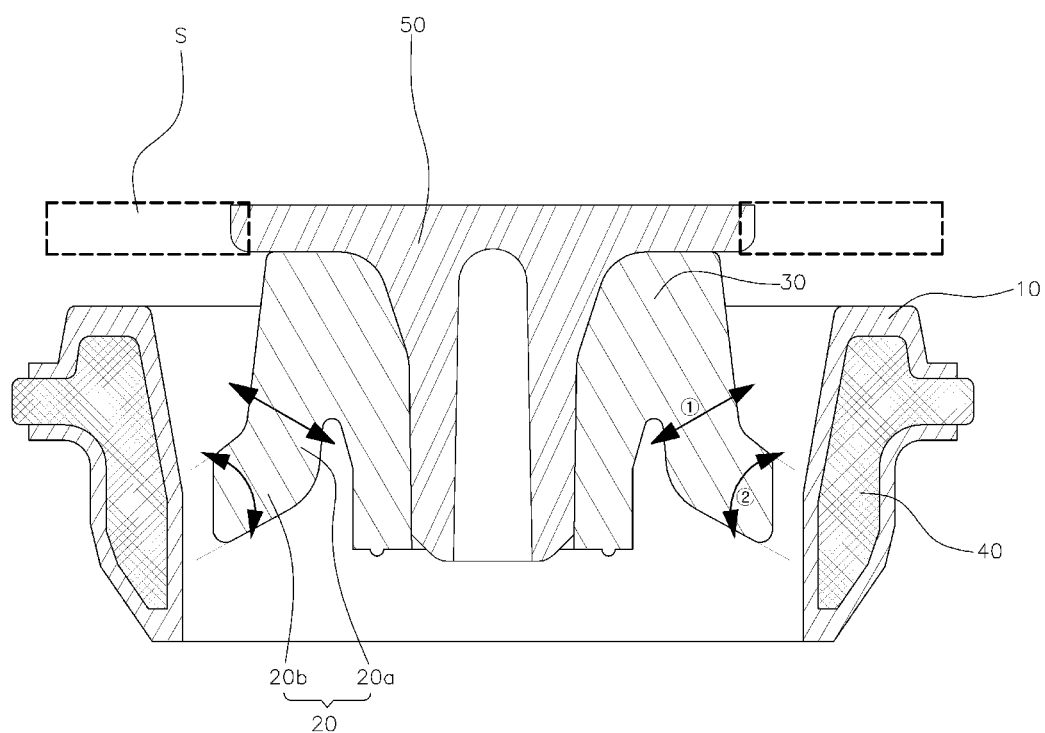
FIG. 6 is a view in which directions of behaviors of a first support portion and a second support portion are indicated.

As illustrated in FIG. 6, in the radiator bushing 100 of the present disclosure, the first support portion 20a moves along the ① direction similar to an X direction (left and right direction of the vehicle body) and a Y direction (forward and rearward direction of the vehicle body), and the second support portion 20b moves along the ② direction similar to a Z direction (an up and down direction of the vehicle body).

That is, when force and/or vibration is transferred through the radiator pin 50, a characteristic of attenuating the force and the vibration in the X and Y directions is determined by the first support portion 20a, and an attenuation characteristic in the Z direction is determined by the second support portion 20b. Therefore, the attenuating characteristic in the Z direction (dynamic characteristics and/or static characteristics) may be more easily tuned by adjusting a thickness and an angle of the first support portion 20a.

A head of the radiator pin 50 may be formed wider by "S" than a head of the related art in order to control a behavior in the up and down direction (the Z direction).

The radiator bushing 100 may secure a higher degree of freedom in design in comparison with a structure of the related art.

That is, rigidity in a horizontal direction (the X and Y directions) is lowered in comparison with the structure of the related art such that the radiator bushing 100 serves as a dynamic damper, and a side effect (vibration in the X and Y directions) is minimized to secure the degree of freedom of design, thereby improving an effect of attenuating vibration when the engine idles.

Characteristics of attenuating vibration may be separated by the X, Y, and Z directions in accordance with vibration characteristics, and as a result, the radiator bushing may be freely tuned (designed) for each type of vehicle.

Meanwhile, the exemplary embodiments of the present disclosure disclosed in the present specification are only specific examples for easy understanding of the present disclosure and is not limited thereto. A person skilled in the art would recognize that besides the exemplary embodiments disclosed herein, various modifications can be made based on the technical spirit of the present disclosure.

What is claimed is:

1. A radiator bushing, which is mounted in a vehicle body to support a load of a radiator so that a pin of the radiator is inserted into a center hole penetrating in a vertical direction, the radiator bushing comprising:
    a mounting portion having an outer side fixed to the vehicle body and formed in a ring shape;
    a center core standing vertically at a center of the mounting portion and having the center hole; and
    a support portion having an inner side connected to the center core, and an outer side connected to an inner circumferential surface of the mounting portion,
    wherein the support portion includes a first support portion extending downward from an upper end of the center core, and a second support portion extending downward from the first support portion and connected to the inner circumferential surface of the mounting portion, and an inclined angle of the first support portion and an inclined angle of the second support portion different,
    wherein the first support portion and the second support portion are connected to each other in an angulate form and have a two-stage structure, and the upper end of the center core protrudes upwardly to be higher than an upper end of the mounting portion, and wherein the inclined angle of the first support portion is greater than the inclined angle of the second support portion such that the first support portion stands more vertical than the second support portion.

2. The radiator bushing of claim 1, wherein, the radiator bushing comprises a synthetic resin material having elasticity, and a ring shaped stopper comprising a material having rigidity higher than that of the radiator bushing is mounted inside the mounting portion.

3. The radiator bushing of claim 2, wherein one or more drain holes are perforated in the support portion.

\* \* \* \* \*